United States Patent Office 3,560,418
Patented Feb. 2, 1971

3,560,418
STYRENE-ACRYLONITRILE COPOLYMERS AND
PROCESS FOR THEIR PREPARATION
Joseph Matthew Kelley, Westfield, Walter F. Hanzl,
Pompton Plains, and M Robert Stepanian, Rochelle
Park, N.J., assignors to Dart Industries Inc., a corporation of Delaware
No Drawing. Filed June 12, 1968, Ser. No. 736,272
Int. Cl. B01f 17/32; C08f 1/11, 19/18
U.S. Cl. 260—17    2 Claims

ABSTRACT OF THE DISCLOSURE

A technique is herein provided for preparing clear, water white big styrene-acrylonitrile copolymer beads with low or negligible monomer concentration via a suspension polymerization process employing critical amounts of hydroxyethyl cellulose and an epoxy resin.

BACKGROUND OF THE INVENTION

This invention relates to a method of suspension polymerization of styrene and acrylonitrile to produce a resinous composition and more particularly to a suspension polymerization technique wherein beads of styrene-acrylonitrile copolymer resins of this invention are useful in many applications including those wherein polyblends of ABS and styrene-acrylonitrile copolymers are prepared.

PRIOR ART

Heretofore it has been known to prepare beads by polymerization of various vinyl monomers in a suspension system such as a system wherein water with various suspending agents is used in operation. Thus polystyrene and particularly impact polystyrene can be prepared by polymerizing first the rubbery material and the styrene in a prepolymerization step followed by a suspension step wherein the polymerization is continued to form beads of high impact polystyrene material. A process illustrating this technique is shown in U.S. Pat. 3,284,542 and in said patent it is pointed out that not all suspending agents have equivalent function or effect in their action. That patent discloses a preference for the use of a hydroxyethyl cellulose of certain specific properties and such suspending agent will be referred to hereinafter.

Styrene per se has been polymerized in aqueous suspension and suspending agents such as talc and tricalcium phosphate (see U.S. Pats. 2,524,627 and 2,673,194), and have been described as useful to prepare the polystyrene or the styrene-acrylonitrile polymers in bead form. Difficulties, however, have been encountered in attempting to repeat the processes of the above described art with respect to the polymerization of styrene and acrylonitrile to prepare large beads such as those 50% of which can be retained on a 60 mesh screen. Moreover, beads of this particular size are important in giving a uniform bead and specifically a clear bead which can be used for blending with other compositions.

STATEMENT OF THE INVENTION

It is an object of this invention to provide a process for preparing large styrene-acrylonitrile copolymer beads having low monomer concentration.

It is a further object of this invention to provide clear styrene - acrylonitrile copolymer beads having a low monomer concentration and having uniform particle size.

It is a still further object of this invention to provide a process for polymerizing styrene-acrylonitrile which will result in formulation of beads having a clear water white appearance and which have not heretofore been capable of preparation in accordance with the known processes indicated hereinabove.

The objects of this invention are accomplished by polymerizing styrene and acrylonitrile monomers or their equivalents in a ratio of 70–80% styrene and 30–20% acrylonitrile in an aqueous medium containing a critical amount of a hydroxyethyl cellulose, said amount being from 0.02 to 0.08, preferably about 0.03 (plus or minus 0.02%) based on the water and a minor amount of an acid scavenger such as an epoxy compound to control the bead color and to lend stability on heating. In this process the hydroxyethyl cellulose critically controls the bead size of the copolymer and also serves as a suspending agent in the system.

The hydroxyethyl cellulose applicable to the process herein is more fully described in U.S. Pat. 3,284,542 and is a material which has a viscosity in a 1% aqueous solution at 25° C. of from 750 to 10,000 cps. (Brookfield Viscometer). The hydroxyethyl cellulose which exhibit high viscosities in aqueous solutions are those preferred in the process of this invention and they are soluble in hot or cold water.

The epoxy compound useful in this process can be readily prepared according to the prior art such as disclosed in U.S. Pat. 2,643,239 of June 23, 1953.

PREFERRED EMBODIMENTS

In the preferred embodiment hydroxyethyl cellulose of a Brookfield viscosity (25° C. in a 1% aqueous solution) of from 1500 to 3500 cps. is employed as a suspending agent in an aqueous system in critical amounts of about 0.03% based on the water. The suspending agent concentration can vary but minimally, that is only plus or minus 0.02% and should the variance be greater than indicated, then the resulting beads will not be of the appropriate particle size desired, namely that size which has been denoted as a large size and is defined as beads 50% of which can be retained on 60 mesh or better. The mesh measurement is performed according to ASTM D–1921–63.

When the above technique is followed, namely when employing critical amounts of the hydroxyethyl cellulose, it has been found that not only is the uniformity of the beads constant but also low concentrations of monomer are possible such as less than about 0.05%, specifically when certain preferred initiators are employed in the process herein.

In the process herein, in order to control the color of the copolymer beads and the stability thereof upon heating an epoxy compound as noted above can be used and preferably an "Epon 812" which is one of a well known series of glycidal ethers and is a mixture of branched di- and tri-epoxides made by the condensation of epichlorohydrin and glycerine having an epoxide functionality of 2.2 (Shell Chemical Company). The entire combination of ingredients in this process results in the production of the water white beads which, as indicated above, has not been obvious to prepare in view of the art of record. It is preferred in accordance with the process of this invention to employ from .05% to 0.25% of an epoxy compound to control color and stability of the beads. The amount employed, for example, 0.1% of an epoxy such as "Epon 812" is based on the weight of monomers. Another example of an epoxy type compound useful herein is "Paraplex G62" a Rohm and Haas product, which is an epoxidized soybean oil plasticizer.

In order to control the melt flow of the styrene-acrylonitrile copolymer a mercaptan can be used as a chain transfer agent. Mercaptans such as tertiary dodecyl mercaptan can be used in amounts of from 0.1% to 0.9% based on the total monomer and with such amounts the melt flow of the material can be readily controlled to obtain products ranging in melt flows of from 1 to 100 according to ASTM D-1238-62T using a 5000 grams weight at 230° C. Thus, within the range of from 0.1 to 0.6 tertiary dodecyl mercaptan styrene-acrylonitrile copolymers having melt flows ranging from 1 to 200 are possible (a 72/28 or 75/25 ratio of styrene to acrylonitrile in the polymerization).

Due to the critical nature of all of the ingredients and components required to prepare clear water white large styrene-acrylonitrile copolymer beads, it is preferred to employ demineralized water in the process herein. A general technique for preparing the reaction mixture is to add the water and the hydroxyethyl cellulose to a vessel followed by the addition of a small amount, approximately 0.15% based on the final product, of ethylene diamine tetraacidic acid and then bubbling nitrogen through the solution for approximately ½ hour to insure removal of detrimental materials. The remainder of the ingredients are then added such as the monomeric styrene-acrylonitrile mixture and additives such as tertiary dodecyl mercaptan and antioxidant such as 2,6-ditertiary-butyl-4-methylphenol ("Ionol") the epoxy resin, and if desired a dye followed by addition of the catalyst.

In the preferred process of this invention t-butyl perbenzoate is the initiator of choice although other initiators such as t-butyl peracetate will also give good results. The t-butyl perbenzoate is added in the above aqueous suspension containing the polymerizable ingredients in amounts of about 0.15% prior to initiation of the polymerization. A second higher temperature peroxide such as t-butyl peroxide can be used to reduce monomer content at the higher temperature plateau.

Subsequent to the addition of the ingredients above, the polymerization cycle is started and in general this includes polymerizing at a temperature of from 200 to 270° F. for from 4 to 10 hours. The cycle is started by raising the temperature of the mixture to about 220° F. and maintaining this for approximately 4 hours. Subsequent to this, the temperature is raised in about one hour to about 240° F. and then to about 265° F. where it is held for an additional 2 hours. This preferred polymerization cycle results in the production of large styrene-acrylonitrile copolymer beads which are water white and which contain less than 0.05% monomer. A combination of optical brighteners and a blue dye can be added to the suspension mixture directly before polymerization is started. Alternately either of the two above components can be added separately to give the desired tint.

The following represents a large scale preparation of styrene-acrylonitrile copolymer of a melt flow of 14 to 15.

EXAMPLE

Styrene and acrylonitrile monomers in a ratio of 75/25 were charged to an aqueous bath which had previously been calculated to result in a water to polymer ratio of about 1.8:1 the following parts by weight were employed:

| | |
|---|---:|
| Styrene | 74.475 |
| Acrylonitrile | 24.825 |
| t-Butyl Perbenzoate | 0.150 |
| t-Dodecyl mercaptan | 0.250 |
| Sodium salt of ethylenediamine tetraacidic acid | 0.150 |
| "Ionol" | 0.050 |
| "Epon 812" | 0.100 |
| Total | 100.000 |

In formulating the above, about 100 parts water were employed containing 0.03 percent of hydroxyethyl cellulose. The polymerization was carried out by heating at 185 to 220° F. for about 5½ hours and 220 to 240 for 1½ hours followed by heating at 240 to 265° F. for about 2½ hours. The beads were recovered and dried. The above procedure was followed in preparing beads of styrene-acrylonitrile copolymer shown in the Tables below with the exceptions noted.

TABLE I
[Effect of hydroxyethyl cellulose (HEC) on bead size]

| Run: | Water/monomer | HEC * | Sieve analysis ** | | | | | |
|---|---|---|---|---|---|---|---|---|
| | | | 20 | 40 | 60 | 80 | 100 | >100 |
| 1 | 1.5 | 0.12 | | 1.2 | 8.8 | 23.8 | 22.8 | 43.4 |
| 2 | 1.5 | 0.08 | | 1.4 | 18.8 | 41.8 | 16.8 | 21.2 |
| 3 | 1.5 | 0.06 | | 1.5 | 23.0 | 44.1 | 13.3 | 18.1 |
| 4 | 1.5 | 0.04 | | 3.4 | 50.0 | 35.6 | 3.8 | 5.2 |
| 5 | 1.5 | 0.03 | 0.2 | 36.2 | 52.8 | 9.6 | 0.6 | 0.6 |
| 6 | 1.5 | 0.015 | 6.4 | 43.2 | 44.4 | 4.0 | 0.4 | 1.6 |
| 7 | 1.5 | 0.03 | 0.2 | 19.4 | 67.4 | 10.8 | 1.4 | 0.8 |

* Percent based on water.
** ASTM noted hereinbefore.

TABLE II
[Effect of chain transfer agent (t-ddm) on melt flow]

| Run: | Styrene-acrylonitrile ratio | t-Dodecyl mercaptan | Melt index |
|---|---|---|---|
| 1 | 72/28 | 0.50 | 60 |
| 2 | 72/28 | 0.10 | 0.8 |
| 3 | 72/28 | 0.70 | 133 |
| 4 | 72/28 | 0.75 | 168 |
| 5 | 72/28 | 0.20 | 3.8 |
| 6 | 72/28 | 0.41 | 33.8 |
| 7 | 75/25 | 0.75 | 267 |
| 8 | 75/25 | 0.41 | 51.8 |
| 9 | 75/25 | 0.205 | 7.0 |
| 10 | 75/25 | 0.295 | 20.6 |

In the above Table I it can readily be seen that the amount of suspending agent is critical to prepare the beads of this invention in the size heretofore indicated. When beads of the size preferred herein are prepared, the uniformity thereof aids greatly in processing equipment and the "fines" and/or "floaters" problems are substantially overcome. Uniformity of beads also leads to attractive appearance of finished articles and when beads of the type above are impregnated with a blowing agent and foamed, the ultimate articles can be used for a variety of applications.

The foregoing description of the invention as well as the Example illustrate the process and the best method contemplated herein for carrying out said process. Resort may be had to other modifications and equivalents herein such as the use of styrene and acrylonitrile including higher homologues and/or alkyl substituted derivatives of these.

What is claimed is:
1. A process for preparing styrene-acrylonitrile resinous compositions of ultimate low monomer concentration in the order of less than 0.05% in bead form wherein the beads are water white which comprises carrying out said polymerization in an aqueous suspension containing hydroxyethyl cellulose in an amount of about 0.02 to 0.04% by weight based on the water in the aqueous suspension and an epoxy compound selected from the group consisting of the condensation product of epichlorohydrin and glycerine and an epoxidized soybean oil plasticizer in an amount of about 0.05 to 0.25%, the said styrene and acrylonitrile being polymerized in a ratio of 70 to 80 percent styrene and 30 to 20 percent acrylonitrile and the hydroxyethyl cellulose being characterized by having a viscosity in a 1% aqueous solution at 25° C. of 750 to 10,000 cps. (Brookfield viscometer) and recovering said beads having a particle size such that 50% and higher are retained on a 60 mesh screen.

2. The process of claim 1 wherein tertiary butyl perbenzoate is used as the initiator in the polymerization and the polymerization cycle comprises heating the mixture at temperatures of from 200 to 270° F. for 4 to 10 hours.

References Cited

UNITED STATES PATENTS

| | | | |
|---|---|---|---|
| 2,538,051 | 1/1951 | Schick | 260—85.5N |
| 2,836,585 | 5/1958 | Hill | 260—85.5NX |
| 2,984,648 | 5/1961 | Williams et al. | 260—45.95 |
| 3,198,775 | 8/1965 | Delacretaz et al. | 260—85.5H |
| 3,228,919 | 1/1966 | Gatta et al. | 260—85.5 |

WILLIAM SHORT, Primary Examiner

L. M. PHYNES, Assistant Examiner

U.S. Cl. X.R.

260—85.5